(12) United States Patent
Kanno

(10) Patent No.: US 7,744,115 B2
(45) Date of Patent: Jun. 29, 2010

(54) AIRBAG-RELEASING STRUCTURE, INNER CASE, AND AIRBAG DEVICE

(75) Inventor: Yuki Kanno, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/134,963

(22) Filed: Jun. 6, 2008

(65) Prior Publication Data

US 2009/0033073 A1 Feb. 5, 2009

(30) Foreign Application Priority Data

Jul. 30, 2007 (JP) ............................. 2007-198093

(51) Int. Cl.
*B60R 21/20* (2006.01)
*B60R 21/215* (2006.01)

(52) U.S. Cl. .................. 280/728.3; 280/728.2; 280/732

(58) Field of Classification Search .............. 280/728.2, 280/728.3, 732
See application file for complete search history.

(56) References Cited

U.S. PATENT DOCUMENTS

| | | | | |
|---|---|---|---|---|
| 6,623,029 B2* | 9/2003 | Sun et al. | ................ | 280/728.2 |
| 7,007,970 B2* | 3/2006 | Yasuda et al. | ............ | 280/728.3 |
| 7,178,825 B2* | 2/2007 | Fujii et al. | ................ | 280/728.3 |
| 7,210,700 B2* | 5/2007 | Zagrodnicki | ............. | 280/728.3 |
| 7,234,726 B2* | 6/2007 | Trevino et al. | ........... | 280/728.3 |
| 2005/0269804 A1* | 12/2005 | Yamada et al. | ........... | 280/728.3 |
| 2006/0017268 A1* | 1/2006 | Bondoerffer | ................ | 280/732 |
| 2006/0033313 A1* | 2/2006 | Horiyama | ................. | 280/728.3 |
| 2006/0181065 A1* | 8/2006 | Yamada et al. | ........... | 280/728.3 |
| 2007/0080521 A1* | 4/2007 | Leserre et al. | ........... | 280/728.3 |
| 2007/0145728 A1* | 6/2007 | Sadano et al. | ............... | 280/732 |
| 2008/0023944 A1* | 1/2008 | Dargavell et al. | ........ | 280/728.2 |
| 2009/0243265 A1* | 10/2009 | Evans et al. | .............. | 280/728.3 |

FOREIGN PATENT DOCUMENTS

| | | |
|---|---|---|
| JP | 2002-012116 A | 1/2002 |
| JP | 2003-137055 A | 5/2003 |
| JP | 2003-137057 A | 5/2003 |
| JP | 2006-096267 A | 4/2006 |

* cited by examiner

*Primary Examiner*—Ruth Ilan
*Assistant Examiner*—James English
(74) *Attorney, Agent, or Firm*—Fitch, Even, Tabin & Flannery (57) ABSTRACT

An airbag-releasing structure capable of smoothly releasing an airbag in the vehicle, an inner case, and an airbag device are provided. In one form, the inner case of the present invention includes the inner panels connected to the inside of the outer panel, and the side walls defining the space for housing the retainer. Each inner panel includes the supporting portion connected to the fixing portion of the outer panel, the flap portion welded to the door portion, and the hinge portion formed between the supporting portion and the flap portion. The hinge portion has the apex section, the connecting section adjacent to the supporting portion, which connects the supporting portion and the apex section, and the connecting section adjacent to the flap portion, which connects the flap portion and the apex section. The connecting section adjacent to the supporting portion and the connecting section adjacent to the flap portion each have a straight section extending in the direction in which the airbag is released.

10 Claims, 5 Drawing Sheets

AIRBAG-RELEASING STRUCTURE, INNER CASE, AND AIRBAG DEVICE

FIELD OF THE INVENTION

The present invention relates to an airbag-releasing structure, an inner case, and an airbag device for an airbag installed in a vehicle such as a car. More specifically, the present invention relates to an airbag-releasing structure capable of smoothly releasing an airbag in the vehicle when an airbag device is activated, an inner case, and an airbag device.

BACKGROUND OF THE INVENTION

Typically, vehicles, such as cars, are equipped with airbag devices that restrain occupants by inflating and deploying airbags in the vehicles in case of a crash. Various types of airbag devices, such as driver airbag devices equipped in steering wheels, passenger airbag devices equipped in instrument panels, side airbag devices equipped in side panels or seats of vehicles, and curtain airbag devices equipped in areas above doors, have been developed and used. These airbag devices are normally stored in vehicle components so as to make their presence unnoticeable. In an emergency such as a crash, the airbag devices inflate and deploy airbags by making the airbags burst through vehicle components. Accordingly, while airbag-releasing portions of airbag devices normally need to be covered to conform to the appearance of interior equipment of vehicles, they must be able to smoothly and quickly release airbags in an emergency.

Figure 5:
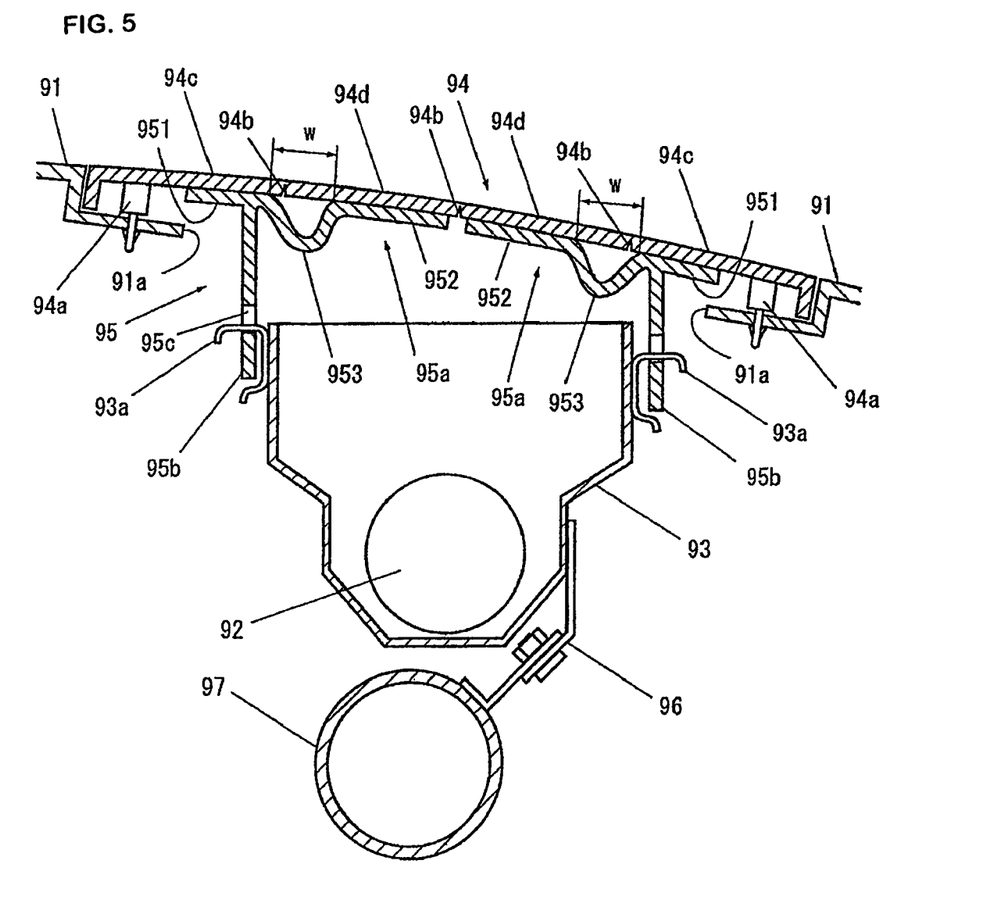
FIG. 5 is a sectional view of a conventional passenger airbag device.

FIG. 5 is a sectional view of a passenger airbag device. The passenger airbag device is equipped in an instrument panel 91, on the vehicle body side, positioned in front of a passenger seat. As shown in FIG. 5, the passenger airbag device includes an airbag (not shown), which is normally folded and is inflated and deployed in an emergency, an inflator 92 for supplying the airbag with gas, a retainer 93 for housing the airbag and the inflator 92, an outer panel 94 connected to the instrument panel 91, and an inner case 95 connected to the inside of the outer panel 94, for holding the retainer 93. The retainer 93 is linked and fixed to a fixing member 97 through a connecting member 96.

The instrument panel 91 has an opening 91a through which the airbag is released. The outer panel 94 is fitted to the opening 91a with clips 94a or the like, and the surface of the outer panel 94 is finished so as to conform to the appearance of the instrument panel 91. In the inside of the outer panel 94 is formed a plurality of grooves 94b for enabling the outer panel 94 to be easily split when the airbag is deployed. These grooves 94b divide the outer panel 94 into fixing portions 94c and door portions 94d.

The inner case 95 includes an inner panel 95a connected to the inside of the outer panel 94, and side walls 95b defining a space for housing the retainer 93. The side walls 95b include a plurality of hook holes 95c for receiving hooks 93a attached to the retainer 93. The inner panel 95a is separated into two at the center thereof, and each inner panel 95a includes a supporting portion 951 connected to the corresponding fixing portion 94c of the outer panel 94, a flap portion 952 connected to the corresponding door portion 94d, and a hinge portion 953 formed between the supporting portion 951 and the flap portion 952. As shown in FIG. 5, each hinge portion 953 is substantially U shaped, with the apex section of the hinge portion, the supporting portion 951, and the flap portion 952 being smoothly connected. A non-welded portion having a width w is left between the outer panel 94 and each hinge portion 953.

The above-described passenger airbag device activates the inflator 92 to supply the airbag (not shown) with gas in an emergency such as a vehicle crash. The airbag inflates in the retainer 93 and the inner case 95, and pushes the inner panels 95a and the outer panel 94. The outer panel 94 is split at the groove 94b between the door portions 94d, and the airbag is released in the vehicle. As the airbag is inflated and deployed, the door portions 94d in the outer panel 94 are turned toward the instrument panel 91, and further split at the grooves 94b between the fixing portions 94c and the door portions 94d. At this time, since the fixing portions 94c and the door portions 94d in the outer panel 94 are connected to the inner panels 95a, the door portions 94d do not fall away when split at the grooves 94b. The door portions 94d are further turned toward the instrument panel 91 by the action of the hinge portions 953 of the inner panels 95a until they have opened outward completely.

The inner case 95 is typically made of a resin and is easily affected by the ambient temperature to become hard or soft. Thus, to allow the door portions 94d in the outer panel 94 to properly open outward, the shape of the hinge portions 953 needs to be well designed. For example, a hinge portion disclosed in Japanese Unexamined Patent Application Publication No. 2006-96267 is formed such that it is curved in the direction away from an outer panel, and gradually becomes thin from a fixing portion side toward a door-reinforcing portion side (refer to Japanese Unexamined Patent Application Publication No. 2006-96267, FIG. 4). A hinge portion disclosed in PCT Japanese Translation Patent Publication No. 2003-137057 is formed such that the apex section of the curved portion is thinner than the other portions of the flexure hinge portion (refer to PCT Japanese Translation Patent Publication No. 2003-137057, FIG. 4).

However, since the hinge portion disclosed in Japanese Unexamined Patent Application Publication No. 2006-96267 is generally thicker on the fixing portion side, the amount by which it stretches when an outer panel opens outward is small. Thus, the size of the entire hinge portion (i.e., the diameter of the U-shaped portion) needs to be increased to compensate for the small amount of stretching. If the diameter of the U-shaped portion is increased, however, the width w of the non-welded portion (refer to FIG. 5) left between the outer panel and each inner panel increases, resulting in a problem in that the effect of the inner panels as reinforcements for the outer panel is reduced. In addition, if the size of the hinge portion is increased, the entire hinge portion is pushed during inflation and deployment of the airbag, resulting in another problem in that the door portions of the outer panel cannot smoothly open outward.

The hinge structure disclosed in PCT Japanese Translation Patent Publication No. 2003-137057 has a problem in that, since the portion which is most likely to be stretched when the door portions of the outer panel open outward (the apex section of the curved portion) is thin, the stress is concentrated too much on the apex section of the curved portion.

SUMMARY OF THE INVENTION

The present invention has been made in view of the above problems, and it is an object of the present invention to provide an airbag-releasing structure capable of smoothly releasing an airbag in the vehicle, an inner case, and an airbag device.

The present invention provides an airbag-releasing structure including an opening through which an airbag is released, the opening being formed in a vehicle component; an outer panel that covers the opening; and an inner panel connected to an inside of the outer panel. The outer panel has a door portion which allows the opening to be uncovered when the airbag is deployed, and a fixing portion connected to the vehicle component. The inner panel has a flap portion connected to the door portion, a supporting portion connected to the fixing portion, and a substantially U-shaped hinge portion formed between the flap portion and the supporting portion. The hinge portion has a straight section extending in the direction in which the airbag is released.

The present invention also provides an inner case connected to an inside of an outer panel that covers an opening through which an airbag is released, the opening being formed in a vehicle component, the inner case being housed in the opening. The outer panel has a door portion which allows the opening to be uncovered when the airbag is deployed, and a fixing portion connected to the vehicle component. The inner case has an inner panel connected to the outer panel, the inner panel having a flap portion connected to the door portion, a supporting portion connected to the fixing portion, and a substantially U-shaped hinge portion formed between the flap portion and the supporting portion; and a side wall defining a space for housing a retainer for storing the airbag. The hinge portion has a straight section extending in the direction in which the airbag is released.

The present invention also provides an airbag device including an airbag that is normally folded and is inflated and deployed in an emergency; an inflator for supplying the airbag with gas; a retainer for housing the airbag; an outer panel that covers an opening through which the airbag is released, the opening being formed in a vehicle component; and an inner case connected to an inside of the outer panel and holding the retainer. The outer panel has a door portion which allows the opening to be uncovered when the airbag is deployed, and a fixing portion connected to the vehicle component. The inner case has an inner panel connected to the outer panel, and a side wall defining a space for housing a retainer for storing the airbag. The inner panel has a flap portion connected to the door portion, a supporting portion connected to the fixing portion, and a substantially U-shaped hinge portion formed between the flap portion and the supporting portion. The hinge portion has a straight section extending in the direction in which the airbag is released.

In the above-described inventions, namely, the airbag-releasing structure, the inner case, and the airbag device, the straight section is preferably formed between the supporting portion or the flap portion and the apex section of the hinge portion. Further, the straight section may be formed between the supporting portion and the apex section of the hinge portion, and a slanted section may be formed between the straight section and the supporting portion. Further, the straight section may be thinner than the supporting portion or the apex section of the hinge portion. In the case where the inner panels are arranged side by side such that one inner panel is positioned on the occupant side and another inner panel is positioned on the vehicle component side, one of or each of the hinge portions of the inner panels needs to have the straight section.

According to the above-described airbag-releasing structure, inner case, and airbag device of the present invention, by forming the straight section in the hinge portion, the rigidity thereof in the direction in which the airbag is released can be increased. Accordingly, if the hinge portion is pushed during inflation and deployment of the airbag, deformation in the direction in which the airbag is released can be reduced, whereby the airbag can be smoothly released in the vehicle. Further, by forming the straight section in the hinge portion, the width of the hinge portion can be reduced. This reduces the width of a non-welded portion left between the outer panel and the inner panel, and increases the effect of the inner panel as a reinforcement member for the outer panel. Further, by forming the straight section in the hinge portion, the length of the hinge portion can be increased, without increasing the width of the hinge portion. This effectively provides the necessary range of movement for the hinge portion to open the outer panel, and secures the flexibility of the hinge portion.

Further, by forming the straight section between the supporting portion or the flap portion and the apex section of the hinge portion, beneficial effects of the present invention can be easily exerted while preserving the shape of conventional hinge portions. Further, the slanted section formed between the straight section and the supporting portion helps the hinge portion turn, while reducing the width of the hinge portion. Further, by making the straight section thin, the flexibility necessary for the hinge portion to turn is secured, while the rigidity of portions required to be rigid is maintained. Further, in the case where the hinge portion is provided in a pair so that the hinge portions face each other, the present invention may be applied to either one. The effects of the present invention can be exerted as long as the present invention is applied to one of or each of them.

BRIEF DESCRIPTION OF THE DRAWINGS

FIG. 1 shows a passenger airbag device, in which (A) is a sectional view, and (B) is an enlarged view of part B shown in FIG. 1(A).

FIG. 2 shows an operation of the passenger airbag device shown in FIG. 1 during deployment of the airbag, in which (A) shows an initial stage of inflation of airbag, (B) shows a stage of pushing the outer panel, (C) shows a stage of separating the outer panel, and (D) shows a stage of turning the door portion.

FIG. 3 shows another embodiment of the hinge portions, in which (A) shows a second embodiment, (B) shows a third embodiment, (C) shows a fourth embodiment, (D) shows a fifth embodiment, (E) shows a sixth embodiment, and (F) shows a seventh embodiment.

FIG. 4 shows modification examples of the passenger airbag device shown in FIG. 1, in which (A) shows a second modification example, and (B) shows a third modification example.

DETAILED DESCRIPTION OF THE PREFERRED EMBODIMENTS

Figure 1A:
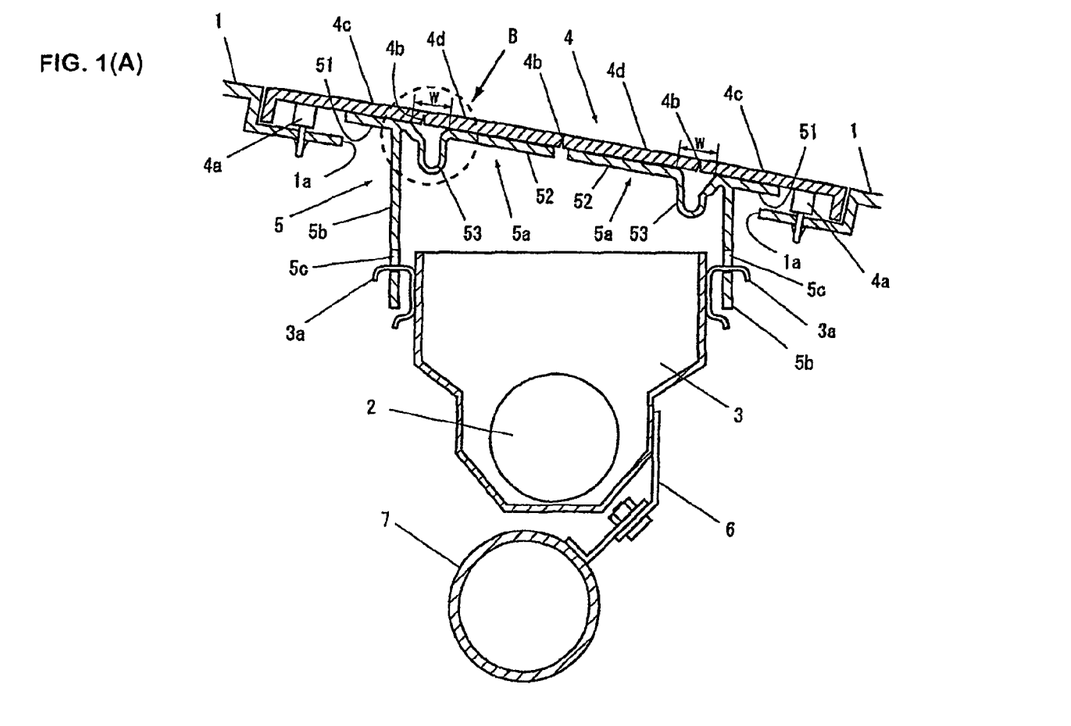
Figure 1B:
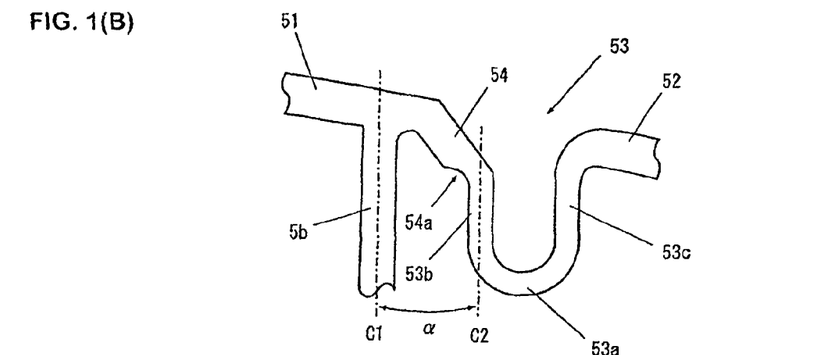

Embodiments of the present invention will now be described with reference to FIGS. 1 to 4. FIG. 1 shows a passenger airbag device, in which (A) is a sectional view, and (B) is an enlarged view of part B shown in FIG. 1(A).

The passenger airbag device shown in FIG. 1 is equipped on the vehicle body side of the instrument panel 1 positioned in front of a passenger seat. As shown in FIG. 1(A), the passenger airbag device includes an airbag (not shown), which is normally folded and is inflated and deployed in an emergency, an inflator 2 for supplying the airbag with gas, a retainer 3 for housing the airbag and the inflator 2, an outer panel 4 connected to the instrument panel 1, and an inner case 5 connected to the inside of the outer panel 4, for holding the retainer 3. The retainer 3 is linked and fixed to a fixing member 7 through a connecting member 6. The inflator 2 may be attached to the retainer 3 externally, instead of being housed in the retainer 3.

The instrument panel 1 has a substantially rectangular opening 1a for releasing airbag, through which an airbag can be released. The outer panel 4, whose surface is finished so as to conform to the appearance of the instrument panel 1, is fitted to the opening 1a with a plurality of clips 4a. In the inside of the outer panel 4 is formed a plurality of grooves 4b for enabling the outer panel 4 to be easily split when the airbag is deployed. These grooves 4b divide the outer panel 4 into a pair of fixing portions 4c, 4c, and a pair of door portions 4d, 4d. The three grooves 4b, 4b, 4b shown in FIG. 1(A) may be one continuous line groove. Although the case where the outer panel 4 and the instrument panel 1 are separate components has been described, the outer panel 4 and the instrument panel 1 may be integrally formed. In that case, the fixing portions 4c, 4c and the instrument panel 1 are continuously formed, and the portion covered by the door portions 4d, 4d makes the opening 1a.

The inner case 5 includes the inner panels 5a connected to the inside of the outer panel 4, and side walls 5b defining a space for housing the retainer 3. Various joining methods including vibration welding, ultrasonic welding, bolting, riveting, adhesive bonding, and thermal caulking, may be used to connect the outer panel 4 and the inner panels 5a. The side walls 5b have a plurality of hook holes 5c for receiving hooks 3a attached to the retainer 3. The inner panels 5a are divided into two at the center, and each inner panel 5a includes a supporting portion 51 connected to the corresponding fixing portion 4c of the outer panel 4, a flap portion 52 connected to the corresponding door portion 4d, and a hinge portion 53 formed between the supporting portion 51 and the flap portion 52. Each hinge portion 53 is substantially U shaped and protrudes in the direction opposite to the direction in which the airbag is released. The airbag-releasing structure includes the opening 1a, the outer panel 4, and the inner panels 5a.

Each hinge portion 53 has, as shown in FIG. 1(B), an apex section 53a, a connecting section 53b adjacent to the supporting portion, which connects the supporting portion 51 and the apex section 53a, and a connecting section 53c adjacent to the flap portion, which connects the flap portion 52 and the apex section 53a. The connecting section 53b adjacent to the supporting portion and the connecting section 53c adjacent to the flap portion each have a straight section extending in the direction in which the airbag is released. By forming these straight sections, the rigidity of the hinge portions 53 against the force exerted thereon when pushed by the airbag during inflation and deployment can be increased, whereby deformation of the hinge portions 53 can be reduced. Further, because the width of the hinge portions 53 can be reduced, the width w of the non-welded portions left between the outer panel 4 and the inner panels 5a can be reduced. Thus, the effect of the inner panels 5a as reinforcement members for the outer panel 4 can be increased. Further, by adjusting the lengths of the straight sections of the connecting section 53b adjacent to the supporting portion and the connecting section 53c adjacent to the flap portion, the range of movement of each hinge portion 53 necessary for opening the outer panel 4 can be set to any value. Accordingly, the flexibility of the hinge portions 53 can be secured.

The airbag is released along the side walls 5b of the inner case 5. Therefore, it can be said that the straight sections in the connecting section 53b adjacent to the supporting portion and in the connecting section 53c adjacent to the flap portion are formed substantially parallel to the side walls 5b. For example, where the axis of each side wall 5b is denoted by C1 and the axis of the straight section in each supporting-portion-side connecting section 53b is denoted by C2, the axis C1 and the axis C2 are ideally parallel to each other. In reality, because of molds used in the manufacturing process, the axis C1 and the axis C2 form an angle α in the range of, for example, 1° to 5°. Thus, the above-described "substantially parallel to each other" includes the case where the angle α is not 0°.

Further, a slanted section 54 is formed between the supporting portion 51 and the connecting section 53b adjacent to the supporting portion. Formation of such a slanted section enables the supporting portion 51 and the connecting section 53b adjacent to the supporting portion to be efficiently connected to each other, narrows the width of each hinge portion 53, and helps each hinge portion 53 turn. Without the slanted section 54, the connecting section 53b adjacent to the supporting portion needs to turn by about 270° in inflation and deployment of the airbag. With slanted section 54, however, the angle by which the connecting section 53b adjacent to the supporting portion turns in inflation and deployment of the airbag can be reduced. Further, the thickness of each hinge portion 53 is decreased at a transition section from the slanted section 54 to the connecting section 53b adjacent to the supporting portion. By making the thicknesses of the connecting section 53b adjacent to the supporting portion, the apex section 53a, and the connecting section 53c adjacent to the flap portion small, the flexibility of the hinge portions 53 can be secured while the rigidity thereof on the supporting portion 51 side being maintained. This enables the flap portion 52 to be easily turned toward the supporting portion 51 side. The transition section from the slanted section 54 to the connecting section 53b adjacent to the supporting portion makes a low-rigidity section 54a serving as a base point when the outer panel 4 opens, and helps the hinge portion 53 turn.

The shapes of the slanted section 54 and the transition section of the connecting section 53b adjacent to the supporting portion are exemplary, and the low-rigidity section 54a is not necessarily formed. The low-rigidity section 54a may be formed in various ways, for example, by making a plurality of punched holes, by forming a plurality of small concave and convex portions, by making a plurality of cuts in the surface, by forming a plurality of slits, and by changing the material to a less rigid one.

Next, referring to FIG. 2, an operation of the passenger airbag device shown in FIG. 1 during deployment of the airbag will be described. FIG. 2 shows an operation of the passenger airbag device shown in FIG. 1 during deployment of the airbag, in which (A) shows an initial stage of inflation of the airbag, (B) shows a stage of pushing the outer panel, (C) shows a stage of separating the outer panel, and (D) shows a stage of turning the door portion.

Figure 2A:
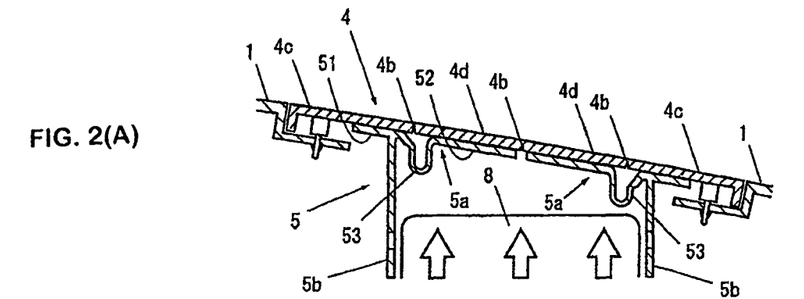

The initial stage of inflation of airbag, shown in FIG. 2(A), is a stage in which the airbag 8 begins to inflate in the inner case 5. The airbag device causes the inflator 2 to supply the airbag 8 with gas, upon receipt of a predetermined signal from an electronic control unit (ECU) that has sensed or detected a crash of the vehicle. The airbag 8 inflates in the direction shown by the arrows in FIG. 2, and contacts one of the hinge portions 53. At this time, because the width of the hinge portions 53 can be reduced in the present invention, the hinge portions 53 are less likely to become an obstacle in the inflation stage of the airbag 8. Further, because the connecting section 53b adjacent to the supporting portion and the connecting section 53c adjacent to the flap portion have the straight sections, the hinge portions 53 have a high rigidity, and are less likely to be deformed when pushed by the airbag 8.

Figure 2B:
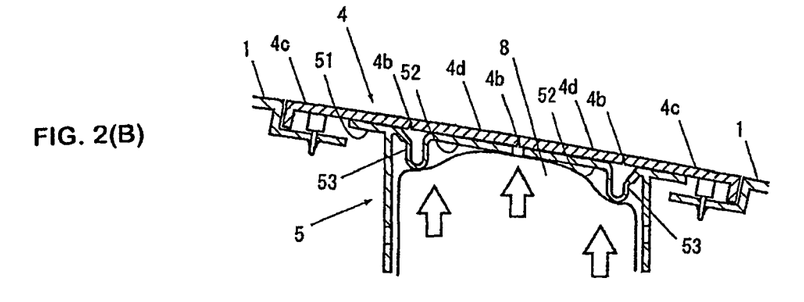

The stage of pushing the outer panel, shown in FIG. 2(B), is a stage in which the airbag 8 inflates in the inner case 5 and pushes the outer panel 4. The airbag 8 inflates further in the direction shown by the arrows from the state shown in FIG. 2(A), contacts the other hinge portion 53, and finally pushes the flap portions 52 of the inner panels 5a. Deformation of the hinge portions 53 is also suppressed in this stage.

Figure 2C:
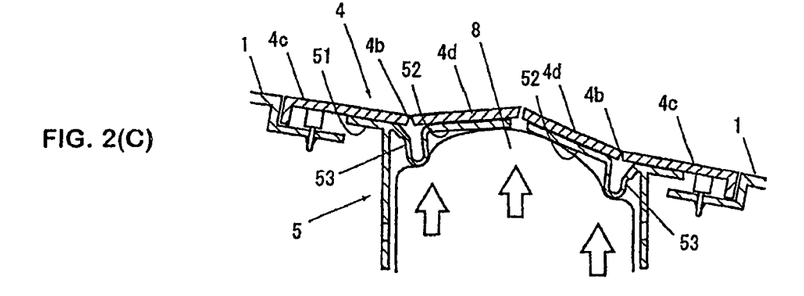

The stage of separating the outer panel, shown in FIG. 2(C), is a stage in which the airbag 8 pushes the outer panel 4 to separate the outer panel 4 into the fixing portions 4c, 4c, and the door portions 4d, 4d. By the action of the hinge portions 53, the door portions 4d, 4d are split along the groove 4b therebetween, before the fixing portion 4c and the door portion 4d are split along the groove 4b therebetween. At this time, upon the separation of the door portions 4d of the outer panel 4, the hinge portions 53 begin to turn. Although the door portions 4d of the outer panel 4 are split from the fixing portions 4c, they do not fall away since the inner panels 4a are connected to the inside thereof.

Figure 2D:
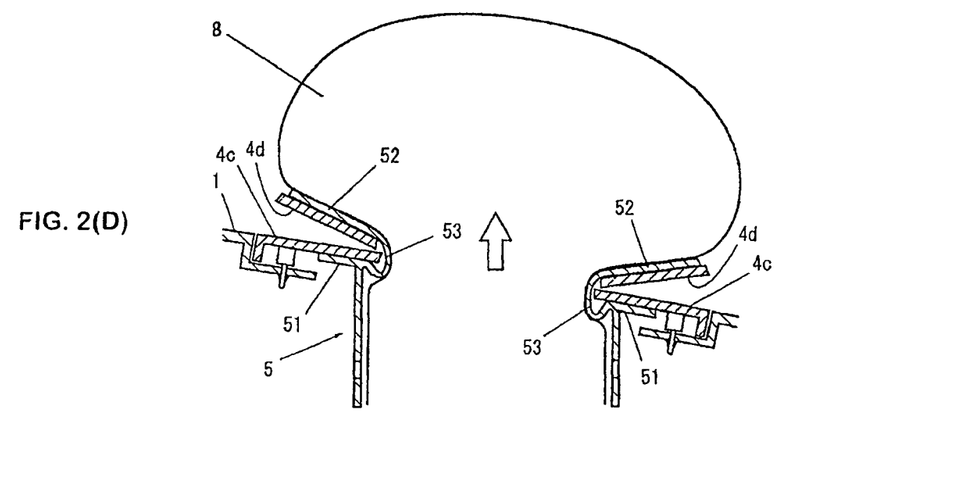

The stage of turning the door portion, shown in FIG. 2(D), is a stage in which the door portions 4d turn about the hinge portions 53 toward the fixing portions 4c side, as the inflation of the airbag 8 progresses. At this time, being pushed by the inflated airbag 8, the hinge portions 53 extend upward. Since the hinge portions 53 have a sufficient range of movement because of the provision of the straight sections in the connecting section 53b adjacent to the supporting portion and in the connecting section 53c adjacent to the flap portion, the door portions 4d can be turned smoothly. Further, since the width w of the non-welded portion between the outer panel 4 and each inner panel 5a is small, the amount by which the door portions 4d jump can be reduced. Thus, in the case where the door portions 4d contact the fixing portions 4c while turning, the impact load resulting therefrom can be reduced.

Next, other embodiments of the hinge portion will be described. FIG. 3 shows other embodiments of the hinge portion, in which (A) shows a second embodiment, (B) shows a third embodiment, (C) shows a fourth embodiment, (D) shows a fifth embodiment, (E) shows a sixth embodiment, and (F) shows a seventh embodiment.

Figure 3A:
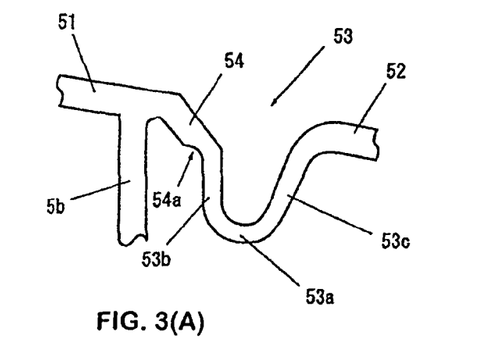
Figure 3B:
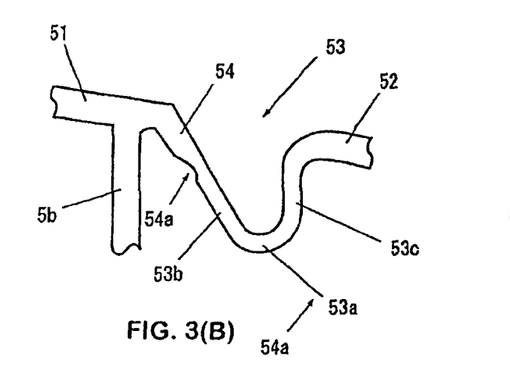

The second embodiment shown in FIG. 3(A) shows the case where the connecting section 53b adjacent to the supporting portion has the straight section, and the connecting section 53c adjacent to the flap portion does not have the straight section. The third embodiment shown in FIG. 3(B) shows the case where the connecting section 53c adjacent to the flap portion has the straight section, and the connecting section 53b adjacent to the supporting portion does not have the straight section. Compared with the conventional hinge portions having no straight section, the hinge portions according to these embodiments have an increased rigidity in the direction in which the airbag is released, even though they have the straight section in one of the connecting section 53b adjacent to the supporting portion and the connecting section 53c adjacent to the flap portion. The third embodiment shown in FIG. 3(B) shows the case where a thinned portion is formed between the slanted section 54 and the connecting section 53b adjacent to the supporting portion. As shown, the low-rigidity section 54a can be easily formed by forming a portion where the thickness is smaller than that of the slanted section 54 and the connecting section 53b adjacent to the supporting portion.

Figure 3C:
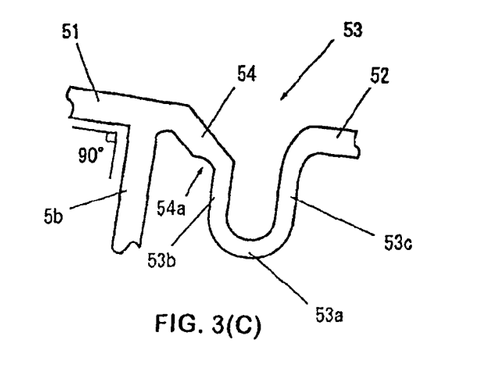

The fourth embodiment shown in FIG. 3(C) shows the case where the supporting portion 51 and the side wall 5b form an angle of substantially 90° with each other. In this case, because the airbag is released along the side wall 5b, the straight sections in the connecting section 53b adjacent to the supporting portion and in the connecting section 53c adjacent to the flap portion also form an angle of substantially 90° with the supporting portion 51.

Figure 3D:
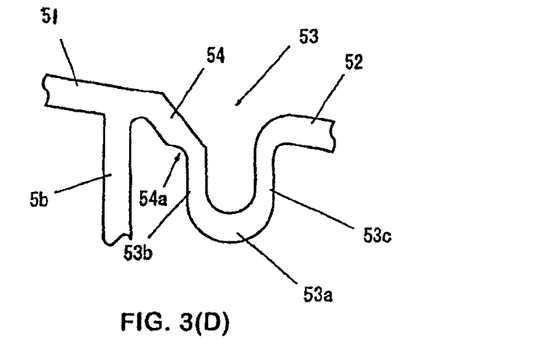

The fifth embodiment shown in FIG. 3(D) shows the case where the thickness of the apex section 53a is larger than the thickness of the connecting section 53b adjacent to the supporting portion and the connecting section 53c adjacent to the flap portion. In this case, the rigidity of the apex section 53a, which tends to be stretched when the hinge portion 53 turns, can be increased. This naturally makes the connecting section 53b adjacent to the supporting portion and the connecting section 53c adjacent to the flap portion constitute thinned portions, helping the hinge portion 53 turn by creating a low-rigidity portion usable as the base point of the turn.

Figure 3E:
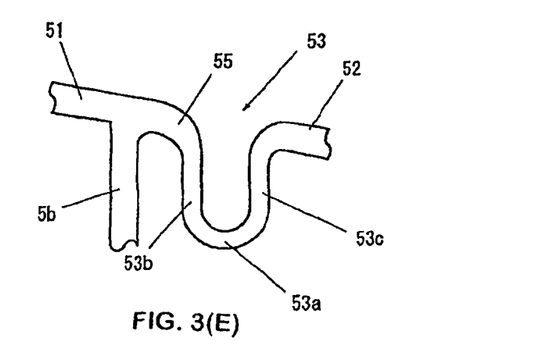
Figure 3F:
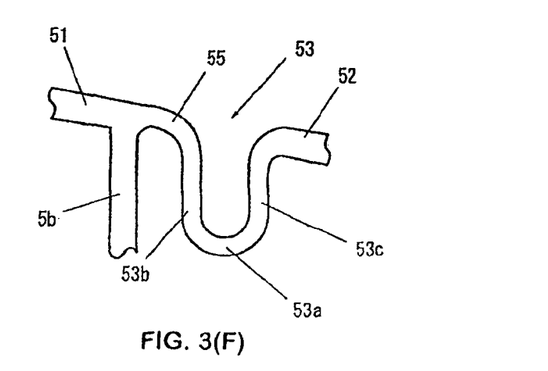

The sixth embodiment shown in FIG. 3(E) shows the case where no slanted section 54 is formed. In this case, a connecting section 55 between the supporting portion 51 and the connecting section 53b adjacent to the supporting portion is formed so as to smoothly connect them to each other. The connecting section 55 may be thicker than the connecting section 53b adjacent to the supporting portion to increase the rigidity. The seventh embodiment shown in FIG. 3(F) shows the case where the connecting section 55 has the same thickness as the connecting section 53b adjacent to the supporting portion. When a structure other than the connecting section 55 secures the rigidity, the connecting section 55 may have such a thickness.

Figure 4A:
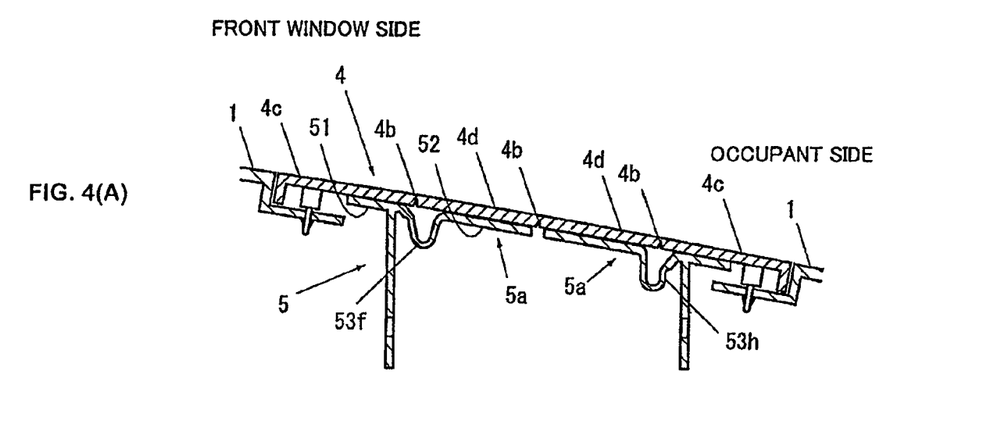
Figure 4B:
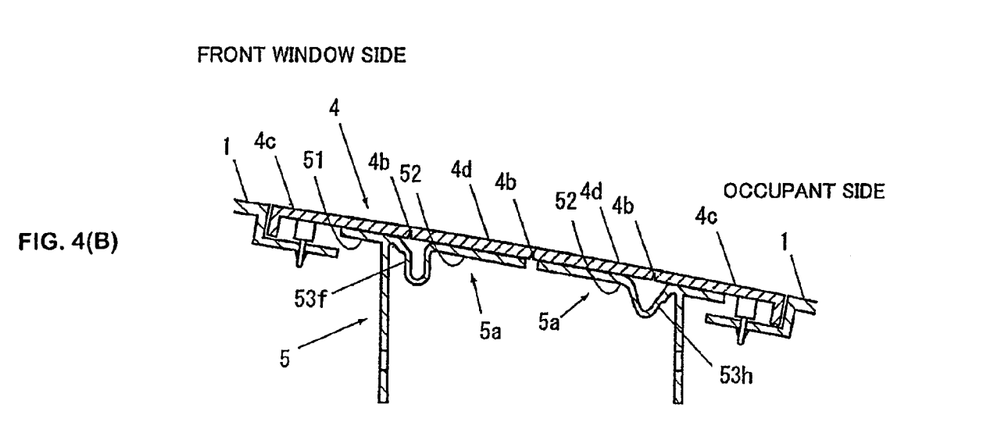

Next, a modification example in which the hinge portion of the present invention is applied to a passenger airbag device will be described. FIG. 4 shows modification examples of the passenger airbag device shown in FIG. 1, in which (A) shows a second modification example, and (B) shows a third modification example. Some of the components, such as the retainer 3 and the like, are not shown here.

The second modification example shown in FIG. 4(A) shows the case where the hinge structure of the present invention is applied to a hinge portion 53h on the occupant side, and the conventional hinge structure is applied to a hinge portion 53f on the front window side. For example, in the case where the airbag is folded in a rolled state, the hinge portion 53h on the occupant side receives a larger load exerted by the airbag. Thus, it must have a higher rigidity than the hinge portion 53f on the front window side. Applying the hinge structure of the present invention to the hinge portion 53h in this case is effective since it increases the rigidity of the hinge portion 53h.

The third modification example shown in FIG. 4(B) shows the case where the hinge structure of the present invention is applied to the hinge portion 53f on the front window side, and the conventional hinge structure is applied to the hinge portion 53h on the occupant side. For example, it is effective that the hinge structure of the present invention is applied to the hinge portion 53f, in the case where the amount by which the door portion 4d on the front window side jumps needs to be reduced because the instrument panel 1 and the front window are close to each other. Because the hinge structure of the present invention has a high rigidity, the hinge portion 53f can be made small, whereby the amount by which the door portion 4d jumps can be reduced.

Although the above embodiments have been described in relation to a passenger airbag device, the present invention is not limited to a passenger airbag device. The present invention can be applied to any airbag device equipped in any part, as long as the airbag-releasing structure has an opening through which an airbag is released, the opening being formed in a vehicle component, an outer panel that covers the opening, and an inner panel connected to an inside of the outer panel, in which the outer panel has a door portion which allows the opening to be uncovered when the airbag is deployed, and a fixing portion connected to the vehicle component, and the inner panel has a flap portion connected to the door portion, a supporting portion connected to the fixing portion, and a hinge portion having a substantially U shape, formed between the flap portion and the supporting portion.

Needless to say, the present invention is not limited to the above-described embodiments, and various modifications can be made within the scope of the present invention. For example, the vehicle component may be, besides an instrument panel, a door, a ceiling, or a steering wheel. It is also possible that the embodiments shown in FIG. 3 be used in combination.

What is claimed is:

1. An airbag device comprising:
    a vehicle panel of a vehicle having an opening therein;
    a cover panel connected to the vehicle and sized to fit in the opening for extending in general alignment with the vehicle panel;
    a frangible portion of the cover panel;
    an airbag retainer assembly including an airbag for being deployed in a predetermined deployment direction toward the cover panel and breaking the frangible portion thereof during airbag inflation out through the vehicle panel opening;
    an inner reinforcement panel of the airbag retainer assembly connected to and extending along an underside of the cover panel for reinforcing the cover panel;
    a generally U-shaped hinge portion of the inner reinforcement panel for pivoting of the inner reinforcement panel thereabout during airbag inflation;
    a straight section of the hinge portion extending in the predetermined deployment direction, wherein the generally U-shaped hinge portion includes a pair of opposing leg portions and a lower, curved apex portion interconnecting the opposing leg portions, and the straight section comprises a pair of straight sections of the pair of opposing leg portions with the pair of straight sections extending parallel to each other and in the predetermined deployment direction;
    wherein the generally U-shaped hinge portion includes a slanted, straight section extending transversely to the predetermined deployment direction;
    wherein the inner reinforcement panel includes side portions on either side of the hinge portion extending along the underside of the cover panel, and the slanted, straight section is between one of the straight sections and one of the side portions of the inner reinforcement panel; and
    the airbag retainer assembly includes a depending side wall portion extending downwardly from the inner reinforcement panel with the hinge portion and one of the side portions of the inner reinforcement panel on one side of the side wall portion and the other side portion of the inner reinforcement panel on the other side of the side wall portion.

2. An airbag retainer assembly for being connected to a vehicle component, the airbag retainer assembly comprising:
    an inner case;
    an upper, inner panel of the inner case for being connected to the vehicle component;
    a side wall of the inner case extending downward from the inner panel;
    an airbag retainer supported by the side wall;
    an airbag in the airbag retainer for being deployed in a predetermined deployment direction toward the inner panel;
    a generally U-shaped hinge portion of the inner case having a pair of opposite leg portions including a widthwise spacing therebetween and extending downwardly from the upper, inner panel adjacent the side wall;
    a straight section of one of the leg portions extending in the predetermined deployment direction and parallel to the side wall; and
    a slanted section of the one leg portion having upper and lower slanted surfaces thereof extending obliquely to the predetermined deployment direction and between the straight section and the upper, inner panel with the slanted section allowing for the widthwise spacing between the opposite leg portions to be minimized.

3. The airbag retainer assembly of claim 2 wherein the other leg portion extends transversely to the straight section.

4. The airbag retainer assembly of claim 2 wherein the hinge portion is on one side of the side wall, and the upper, inner panel includes a portion on the other side of the side wall with the inner panel portion extending orthogonally to the side wall.

5. An airbag retainer assembly for being connected to a vehicle component, the airbag retainer assembly comprising:
    an inner case;
    an upper, inner panel of the inner case for being connected to the vehicle component;
    a side wall of the inner case extending downward from the inner panel;
    an airbag retainer supported by the side wall;
    an airbag in the airbag retainer for being deployed in a predetermined deployment direction toward the inner panel;
    a hinge portion of the inner case extending downwardly from the upper, inner panel adjacent the side wall;
    a straight section of the hinge portion extending in the predetermined deployment direction; and
    a slanted section of the hinge portion extending obliquely to the predetermined deployment direction and between the straight section and the upper, inner panel, wherein the straight and slanted sections have a transition section therebetween that is thinner than the slanted section.

6. An airbag retainer assembly for being connected to a vehicle component, the airbag retainer assembly comprising:
    an inner case;
    an upper, inner panel of the inner case for being connected to the vehicle component;
    a side wall of the inner case extending downward from the inner panel;
    an airbag retainer supported by the side wall;
    an airbag in the airbag retainer for being deployed in a predetermined deployment direction toward the inner panel;
    a hinge portion of the inner case extending downwardly from the upper, inner panel adjacent the side wall;
    a straight section of the hinge portion extending in the predetermined deployment direction; and
    a slanted section of the hinge portion extending obliquely to the predetermined deployment direction and between the straight section and the upper, inner panel,
    wherein the hinge portion has a generally U-shaped configuration including a pair of opposite leg portions and a lower, curved apex portion interconnecting the opposing leg portion with one of the leg portions including the straight and slanted sections, the other leg portion including a straight section extending in the predetermined deployment direction, and the apex portion being thicker than the straight sections.

7. A vehicle having a front window and an occupant protection device for protecting an occupant in a vehicle compartment, the vehicle comprising:

an instrument panel in the vehicle compartment and having an opening therein;

an outer panel sized to cover the opening and having a generally central frangible portion thereof;

a pair of door portions of the outer panel on either side of the central frangible portion so that one of the door portions is closer to the front window and the other door portion is closer to the occupant;

an airbag retainer assembly of the occupant protection device below the outer panel and having an airbag for being deployed in a predetermined deployment direction toward the cover panel;

a pair of inner panels of the airbag retainer assembly with one of the inner panels having a flap portion connected to and extending along the one door portion and the other inner panel having a flap portion connected to and extending along the other door portion;

a pair of hinge portions of the inner panels extending downwardly from the adjacent flap portions with the hinge portions having different configurations from each other; and a straight section of only one of the hinge portions with the straight section extending in the predetermined deployment direction, wherein the one hinge portion having the straight section is adjacent the other door portion closer to the vehicle occupant with the straight section providing the one hinge portion greater rigidity than the other hinge portion.

8. The vehicle of claim 7 wherein the one hinge portion has a generally U-shaped configuration including opposite leg portions with both leg portions having straight sections extending in the predetermined deployment direction.

9. A vehicle having a front window and an occupant protection device for protecting an occupant in a vehicle compartment, the vehicle comprising:

an instrument panel in the vehicle compartment and having an opening therein;

an outer panel sized to cover the opening and having a generally central frangible portion thereof;

a pair of door portions of the outer panel on either side of the central frangible portion so that one of the door portions is closer to the front window and the other door portion is closer to the occupant;

an airbag retainer assembly of the occupant protection device below the outer panel and having an airbag for being deployed in a predetermined deployment direction toward the cover panel;

a pair of inner panels of the airbag retainer assembly with one of the inner panels having a flap portion connected to and extending along the one door portion and the other inner panel having a flap portion connected to and extending along the other door portion;

a pair of hinge portions of the inner panels extending downwardly from the adjacent flap portions with the hinge portions having different configurations from each other;

a straight section of only one of the hinge portions with the straight section extending in the predetermined deployment direction, wherein the one hinge portion is adjacent the one door portion closer to the vehicle window and has a generally U-shaped configuration with the straight section thereof minimizing the width of the one U-shaped hinge portion and the amount of travel of the one door portion away from the outer panel during airbag deployment;

wherein the one U-shaped hinge portion includes opposite leg portions with both leg portions having straight sections extending in the deployment direction for minimizing the width of the one U-shaped hinge portion between the leg portions thereof; and wherein the one hinge portion has a slanted section extending obliquely to the predetermined deployment direction between the one inner panel and one of the straight sections for minimizing the width of the one U-shaped hinge portion between the straight sections thereof.

10. The vehicle of claim 9 wherein the outer panel includes a pair of fixing portions secured to the instrument panel with one of the fixing portions closer to the front window and the other fixing portion closer to the vehicle occupant, side frangible portions dividing the fixing portions from the adjacent door portions, and the slanted section extends between the one fixing portion and the adjacent leg straight section of the one hinge portion.

* * * * *